United States Patent
Senna Da Silva

(10) Patent No.: US 6,724,873 B2
(45) Date of Patent: Apr. 20, 2004

(54) AUTOMATED SYSTEM FOR CONTROLLING THE PARAMETERS INVOLVED IN THE PREPARATION OF AN IMMERSION BATH

(75) Inventor: Leonardo Senna Da Silva, São Paulo (BR)

(73) Assignee: I House Incorporadora Ltda., Sao Paulo (BR)

( * ) Notice: Subject to any disclaimer, the term of this patent is extended or adjusted under 35 U.S.C. 154(b) by 239 days.

(21) Appl. No.: 09/845,670

(22) Filed: Apr. 30, 2001

(65) Prior Publication Data

US 2002/0071535 A1 Jun. 13, 2002

(30) Foreign Application Priority Data

Dec. 14, 2000 (BR) .............................................. 0006494

(51) Int. Cl.$^7$ ............................................. H04M 11/00
(52) U.S. Cl. .............................. 379/102.01; 340/825.37
(58) Field of Search ................ 379/102.01, 102.02, 379/102.04, 102.05; 340/825.24, 825.25, 825.29, 825.37, 825.69, 825.72; 210/86–87; 236/12.11–12.12, 12.15; 307/11; 704/275

(56) References Cited

U.S. PATENT DOCUMENTS

| | | | |
|---|---|---|---|
| 4,665,544 A | * | 5/1987 | Honda et al. .......... 379/102.03 |
| 5,616,239 A | * | 4/1997 | Wendell et al. ............... 210/86 |
| 6,286,764 B1 | * | 9/2001 | Garvey et al. ........... 236/12.12 |
| 6,317,717 B1 | * | 11/2001 | Lindsey et al. ............. 704/275 |
| 6,407,469 B1 | * | 6/2002 | Cline et al. .................... 307/11 |
| 6,461,498 B2 | * | 10/2002 | Tseng .......................... 210/87 |

FOREIGN PATENT DOCUMENTS

| | | | | |
|---|---|---|---|---|
| JP | 04356654 A | * | 12/1992 | ............. F24H/1/00 |
| JP | 10225390 A | * | 8/1998 | ............ A47K/3/00 |

* cited by examiner

Primary Examiner—George Eng
(74) Attorney, Agent, or Firm—Katten Muchin Zavis Rosenman

(57) ABSTRACT

It comprises a central processing unit (CPU), to which a control panel (PC) is attached, said central processing unit (CPU) being connected to the input of a power control circuit (CCP) that selectively controls the opening and closing of a set of valves of hydraulic systems for the passage of hot water (Q), cold water (F), sinking and draining (Ed) and of odoriferous essence (E); said central processing unit (CPU), besides being controlled by the control panel (PC), allows the remote control by means of data receiving and transmitting interfaces (IT, IRF, IES) which are directly and individually connected to the relevant central processing unit (CPU); a voice synthesizing circuit (CSV) that interconnects the central processing unit (CPU) with the data receiving and transmitting interfaces (IT) being provided; the central processing unit (CPU) being connected to an analog-to-digital converting circuit (CCAD), which in turn receives the signals from the sensors (S) physically disposed in strategic places on the immersion bathtub (B); the whole set being connected to a power source (FA).

9 Claims, 2 Drawing Sheets

AUTOMATED SYSTEM FOR CONTROLLING THE PARAMETERS INVOLVED IN THE PREPARATION OF AN IMMERSION BATH

FIELD OF THE INVENTION

The present specification is related to an automated system for controlling the parameters involved in the preparation of an immersion bath such as, swimming pools, bathtubs and the like and, more specifically, to an intelligent preprogrammed and selective control system for actuating all the mechanisms involved in the preparation of an immersion bath, such as water level, temperature, addition of odoriferous essences and/or bath salts and the time the mass of the contained water is maintained, temperature, as well as the lighting thereof.

BACKGROUND OF THE INVENTION

As is thoroughly known, presently the water mass and the temperature of the latter in immersion type bathtubs, jacuzzi whirlpools, SPA type bathtubs, Japanese whirlpools, among others, are manually controlled by turning handles that actuate check valves that allow for the opening and/or closing of the public water flow towards the bathtub, the operation of the water recirculating pump in jacuzzi whirlpool being actuated by a on-off button disposed in an easy-to-access place inside the area of the bathtub box; further, in the case of swimming pools, feeding and water recirculating pumps are provided for cleaning and filtering the mass of water retained in the swimming pool, said pumps being actuated by on-off buttons disposed in an easy-to-access place out of the swimming pool deck area.

Both in immersion bathtubs and jacuzzi whirlpools, the hot and cold water flows that get into the bathtub are actuated by the relevant handles that allow the selective and metered passage of the amount of cold and hot water necessary to dose, according to the user's will, the mass of water inside the bathtub. The hot water is previously heated by electric, solar and/or gas heaters, among others, where the heating power is directly related with the water outflow therethrough.

In spite of being widely used, both immersion bathtubs and jacuzzi whirlpools suffer drawbacks among which we can mention: the non-memorization of the selective graduation of the temperature of the water to be used in the bath; the non-maintenance of the mass of water contained in the bathtub, in accordance with the physical size, evaporation and/or number of people and the taste of a certain user, among others.

Specifically, in the case of jacuzzi whirlpools, one of the drawbacks is the fact that it is operated only when the user is in the bathroom, thus needing to wait before it is full of water or getting into same before it is filled up with water.

Another drawback of these jacuzzi whirlpools conventionally known is the fact that the filling level of the bathtub is manually controlled by the user himself/herself, who must get into the bathtub in advance so that his/her own body mass is compounded with the mass of water poured into the bathtub, thus defining the water level of the occupied bathtub. This prevents the bathtub to be used by more than one person at the same time.

Another drawback of these jacuzzi whirlpools conventionally known is the fact of that the bath temperature is generally determined by the mixture of hot and cold water flows that are poured into the bathtub, said mixing being manually carried when the user turns mixing handles, the temperature gradient being defined by the touch sensitivity of the user who must touch the bath water to determine the desired temperature every time he/she wishes to have a bath. This can bring about burnings.

Another drawback of these jacuzzi whirlpools conventionally known is the fact that the mixing of the odoriferous essence and bath salts that compose the immersion solution must also be manually added randomly doses by the user himself/herself, thus compelling him/her to define or identify an ideal amount of odoriferous essence and/or bath salt that satisfies its pleasure or preference.

Another drawback of these jacuzzi whirlpools conventionally known is the fact that all the procedures for regulating the temperature and the water level and adding odoriferous essences and/or bath salts should be carried out manually and empirically for each bath and each bathtub user, that is, for each user the regulation is personal and cannot measured in advance, thus compelling each user to regulate in some way the parameters of his/her bath, even if the latter had already been initially prepared by his/her home servant or housekeeper.

Another drawback of these jacuzzi whirlpools conventionally known is the fact that as the bath goes on and the immersion water gets cooler, if the user wants to remain immersed, he/she needs to add hot water and release an equivalent amount of mixed water in such a way that the bath water level does not exceed the value initially defined. This task happens to be fully manual, thus making it difficult to maintain the temperature and saturation level of the water/essence/salts mixture at the value initially defined.

OBJECTS OF THE INVENTION

It is therefore one of the objects of the present invention to provide an automated system for controlling the parameters involved in the preparation of an immersion bath that allows the memorization of the selective graduation of the temperature of the water to be used in the bath; as well as the memorization of the water mass level to be kept inside the bathtub in accordance with the physical size and taste of a certain user, among others.

Another object of the present invention is to provide an automated system for controlling the parameters involved in the preparation of an immersion bath, more specifically in jacuzzi whirlpools and bathtubs in general, that can be remotely actuated, the user not needing to be present in the bathroom, thus assuring that the user will only get into the bathtub when the bath is effectively ready.

Another object of the present invention is to provide an automated system for controlling the parameters involved in the preparation of an immersion bath that allows for the previous definition of the bathtub filling level according to the user, the latter not needing to get into the bathtub before it is filled up.

Another object of the present invention is to provide an automated system for controlling the parameters involved in the preparation of an immersion bath that allows for the memorization and repetition of a bath temperature value for each user, said mixing being automatically carried out after the user preselects said temperature.

Another object of the present invention is to provide an automated system for controlling the parameters involved in the preparation of an immersion bath that allows for the controlled accurate and predefined mixture of odoriferous essences and/or bath salts that compose the immersion solution.

Another object of the present invention is to provide an automated system for controlling the parameters involved in the preparation of an immersion bath that regulates automatically and permanently the temperature of the water as the bath goes on, thus keeping same constant while the user is immersed, without the need to change the mixture of the immersion water. Thus, water and odoriferous essence can be saved.

At last, the object of the present invention is to provide an automated system for controlling the parameters involved in the preparation of an immersion bath where all the procedures for regulating the temperature regulation and water level and adding the odoriferous essences and/or bath salts are carried out automatically and customized, that is, each user is provided with a regulation previously defined that is started whenever requested.

SUMMARY OF THE INVENTION

These and other objects and advantages of the present invention are attained with an automated system for controlling the parameters involved in the preparation of an immersion bath that comprises a central processing unit, to which a control panel provided with display and alphanumeric keyboard is peripherically connected; said central processing unit being connected to the input of a power control circuit that selectively actuates the opening and closing of a set of valves of hydraulic systems for the passage of hot water, cold water and odoriferous essence; sinker valve and product valve for the bathtub to be self-cleaned, said central processing unit, besides being actuated by the control panel, being remotely controllable by data receiving and transmitting interfaces (pulse and/or tone telephone signal, and/or electric signal, radio frequency signal, and/or others) by being directly and individually connected to said central processing unit; a voice synthesizing circuit being provided that interconnects the central processing unit with the data receiving and transmitting interfaces through pulse and/or tone telephone signal, said central processing unit being connected to an analog-to-digital converting circuit, which in turn receives the signals from (level, temperature, and others) sensors physically disposed in strategic places on the immersion bathtub; the whole set being connected to a power source.

This automated system for controlling the parameters involved in the preparation of an immersion bath also makes return calls to the telephone assigned by the user informing through the voice when the bath is ready.

Said system provides, by programming in the CPU, a maximum time for the bath, and after this time has elapsed the water of the bathtub will get through the sinker and the bathtub is switched off until a new command is set. This time counter is reset every time the user depresses any command on the control panel.

BRIEF DESCRIPTION OF THE DRAWINGS

Next, the present invention will be described with reference to the attached drawings, wherein.

DETAILED DESCRIPTION OF THE INVENTION

Figure 1A:
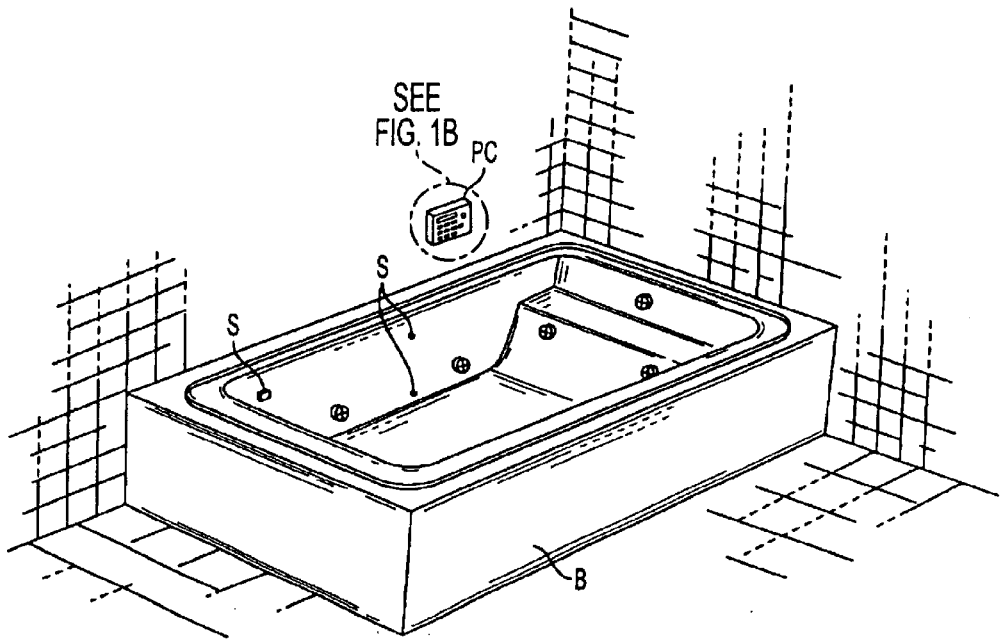
FIG. 1 represents a schematic perspective view of a bathroom provided with a jacuzzi whirlpool provided with the automated system for controlling the parameters involved in the preparation of an immersion bath.
Figure 1B:
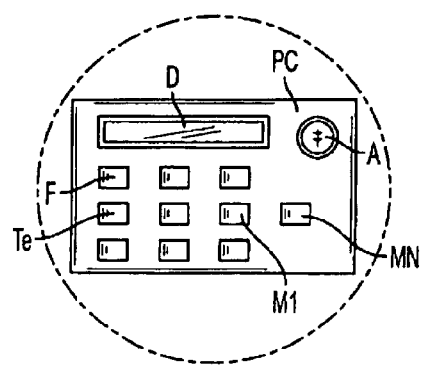
Figure 2:
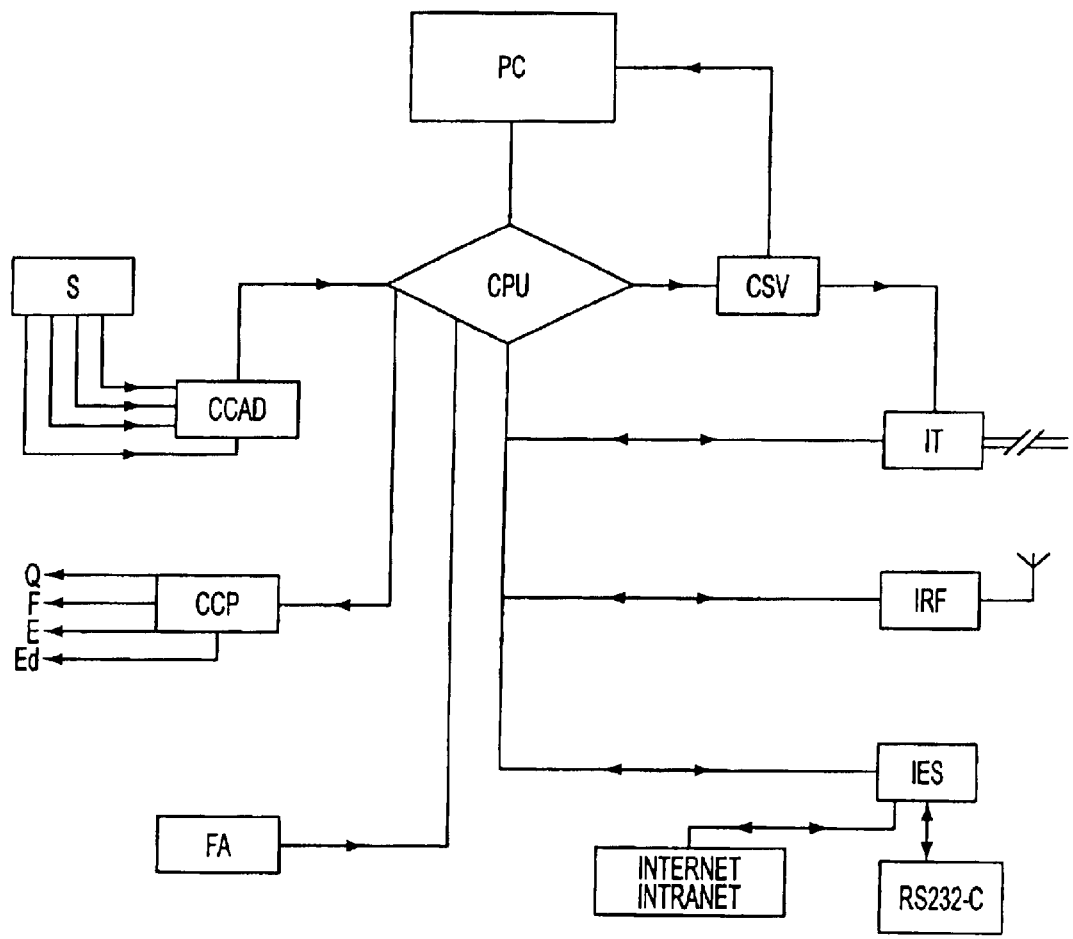
FIG. 2 represents a block diagram of the automated system for controlling the parameters involved in the preparation of an immersion bath.

In accordance with these illustrations, the automated system for controlling the parameters involved in the preparation of an immersion bath object of the present invention is comprised of a central processing unit CPU, to which a control panel PC provided with a display D, an alphanumeric keyboard Te, and a loud speaker, is peripherically connected, see FIG. 1. This central processing unit CPU, is connected to the input of a power control circuit CCP, which is electrically connected to the solenoid valves that selectively actuate the opening and closing of hydraulic systems for passing hot water Q, cold water F, odoriferous essence A and the draining sinker Ed.

The central processing unit CPU, besides being actuated by the control panel PC, allows for the remote control of the system, through data receiving and transmitting interfaces of the telephone interface type IT, for pulse and/or tone lines; of the serial electric interface type IES to be coupled to an automation exchange; or of the radio frequency interface type IRF to communicate with the remote control.

The IRF serves only for the short distance remote control (inside the house), this remote control being a two-way control, and thus the bathtub, once actuated by the RF remote control, will inform the remote control when the bath is ready.

A voice synthesizing circuit CSV is provided that interconnects the central processing unit CPU with the control panel PC and with the data receiving and transmitting interfaces through pulse and/or tone telephone signal IT; further being able to be actuated by the residential automation system via Internet, via the serial interface RS 232-C, or Intranet.

The central processing unit CPU is connected to a circuit for converting analog signals into CCAD digital signals, which in turn receives the signals from the (level, temperature, and others) sensors S physically disposed in strategic places on the immersion bathtub B.

A power source FA connected to the central processing unit CPU feeds all the relevant circuits in the system.

Thus, the automated system allows, besides the control panel PC, the control of the parameters for preparing a bath to be carried out through IT, IRF and IES interfaces which are selectively actuated and remotely controlled, thus determining all the pertinent functions for preparing a bath.

Both the remote control and the 'in situ' control of the system allow a corresponding user to activate the commands for preparing the bath. The system is provided with a set of memories M1, M2 . . . , Mn that allow for the previous storage of data and parameters to be used in the preparation of the bath. When the user calls said memory M1, M2 . . . Mn, after having entered his/her access password, if the access was made remotely via telephone, or, if the access was made 'in situ', the user can control the preparation of his/her bath within the temperature, mixture concentration and water level and lighting parameters preset by the user himself/herself.

In the event a memory password is not entered, the system is activated, thus preparing a new bath, with the parameters (water temperature, level of water contained in the bathtub, concentration of the odoriferous essence and/or bath salts poured into the bath) used for the preparation of the latest bath.

Thus, the user can actuate the system from anywhere, by means of fixed and/or mobile telephone line, by means of electric automation exchange or through the control panel of the bathtub itself, or through remote control via radio frequency signaling, such actuation being interpreted by each one of the respective interfaces IT, IES, IRF.

An operational description of how to activate the automated system for controlling the parameters involved in the preparation of an immersion bath will be presented below.

The lighting power required for lighting the bathtub also can be memorized in memories M1, M2 . . . , Mn.

To start the operation, when the system is actuated it initially identifies the actuation source, which can be the keyboard of the control panel PC itself; or a remote control IES or RF, or a telephone call IT.

In the event the actuation source is the control panel PC, through the keyboard Te, the system checks whether the power button F was depressed or one of the memory buttons M1, M2 . . . , Mn provided in panel PC was depressed.

In the event the power button F is depressed, the system starts operating.

In the event one of the memory buttons M1, M2 . . . Mn is depressed, the later provides the temperature, the mass of water, the odoriferous essence, and the lighting power of the bathtub which were stored previously, and the system starts operating.

In the event the control source is a remote control, for example, of an automation exchange IES, the system starts operating.

In the event the control source is a telephone call IT, the system requests a password number. If the password is not valid, the connection is disabled and the system turns back to its waiting mode. In the event the password is valid, a temperature value is requested, and the system is able to correct same if it is not valid, thus turning back to its waiting mode. In the event the temperature is valid, the user is asked if he/she wants a telephone call confirmation return, and the system starts operating if it is not valid. In the event the confirmation return is requested, a telephone for the return call is requested, and then the system starts operating.

With the system operating, the system initially detects the presence of water in the bathtub, and, if there is any water in the bathtub for some reason, the water draining valve is opened, which valve is kept open until the water contained in the bathtub is drained out, and then this draining valve is closed again and the cold and hot water supply valves are opened.

In the event there is no water in the bathtub, the system checks whether the bathtub draining valve is closed and opens the cold and hot water valves.

Water level and temperature sensors are provided in the bathtub B to allow for the detention of the bath water level and temperature. The system detects the level and temperature of the water contained in bathtub B and compares same with the level and temperature values previously established, balancing the outflows of cold water and hot water until the desired values of the water level and temperature are reached.

When the bath water is balanced with respect to the level and temperature, the system starts dispensing the odoriferous essence through a command, thus prompting the bath solution for use.

The same temperature sensors monitor continuously the bath water temperature, and inform a device about the fall of temperature of the water plus odoriferous essence contained in the bathtub, thus activating an intermediate heater that promotes the recirculation of the water until the temperature of said water gets back to the values preset, when the intermediate heater is switched off.

Other functions can be directly controlled in the control panel PC and/or remotely and timely controlled when the user is inside bathtub B. One of such functions is the actuation of the jets of the jacuzzi whirlpool; another function that can be automatically actuated consists of the turning on the lights of bathtub B itself. Thus, it is possible to also control the time that bathtub B will remain activated.

The control panel PC is provided with a digital display D, colored and provided with light, to indicate the temperature, and the loud speaker informs the user when the temperature inside bathtub B has reached the desired value, which is set by the user, through voice synthesizer CSV.

The system defined above allows the users to also control the time the pumps, filters and heat exchangers will remain activated.

Although a preferred constructive concept has been described and illustrated, it should be understood that design changes are possible and attainable without departing from the scope of the present invention.

What is claimed is:

1. AN AUTOMATED SYSTEM FOR CONTROLLING THE PARAMETERS INVOLVED IN THE PREPARATION AND USE OF AN IMMERSION BATH comprising:

an immersion bath provided with a plurality of sensors that sense temperature, water volume and odoriferous essence;

a central processing unit connected to an analog-to-digital converting circuit that receives signals from the plurality of sensors and to which a control panel is peripherally connected, said central processing unit being connected to an input of a power control circuit that selectively controls the opening and closing of a set of valves of hydraulic systems for the passage of hot water, cold water, sinking and draining and of odoriferous essence into and out of said immersion bath until a predetermined set of temperature, water volume and odoriferous essence parameters is achieved;

data receiving and transmitting means consisting of one of a telephone interface, serial electric interface and radio frequency interface and connected to said central processing unit for remote control of said central processing unit and for remote notification of the achievement of said predetermined set of parameters to a user in a remote location in preparation of use of said immersion bath; and a voice synthesizing circuit that interconnects the central processing unit with the data receiving and transmitting means for voice-based remote notification of the achievement of said predetermined set of parameters to a user in a remote location;

said central processing unit further provided with a plurality of memories for storing and recalling said predetermined set of parameters between uses of said immersion bath and for automatically maintaining and regulating said predetermined set of parameters during use of said immersion bath.

2. The automated system according to claim 1, wherein the control panel is provided with a display, an alphanumeric keyboard, a power button, at least two memory buttons associated with said plurality of memories and a loud speaker.

3. The automated system according to claim 1, wherein the power control circuit is electrically connected to valves that selectively control the opening and closing of hydraulic systems.

4. The automated system according to claim 1, wherein the data receiving and transmitting means is a telephone interface for one of pulse lines and tone lines.

5. The automated system according to claim 1, wherein the data receiving and transmitting means is a serial electric interface coupled to an automation exchange.

6. The automated system according to claim 1, wherein the data receiving and transmitting means is a radio frequency interface for receiving data remotely through radio frequency signaling.

7. The automated system according to claim 1, wherein the data receiving and transmitting means requires an identification and access password for remote accessing of the central processing unit for preparing the immersion bath.

8. The automated system according to claim 1, wherein the data receiving and transmitting means is a telephone interface through the a residence telephone system.

9. The automated system according to claim 1, further comprising means for controlling said central processing unit through one of the Internet and Intranet.

* * * * *